(12) United States Patent
Bhutta

(10) Patent No.: US 7,251,121 B2
(45) Date of Patent: Jul. 31, 2007

(54) ELECTRONICALLY VARIABLE CAPACITOR ARRAY

(75) Inventor: Imran Ahmed Bhutta, Mount Laurel, NJ (US)

(73) Assignee: Innovation Engineering LLC, Mount Laurel, NJ (US)

( * ) Notice: Subject to any disclaimer, the term of this patent is extended or adjusted under 35 U.S.C. 154(b) by 0 days.

(21) Appl. No.: 11/368,690

(22) Filed: Mar. 6, 2006

(65) Prior Publication Data

US 2006/0198077 A1    Sep. 7, 2006

Related U.S. Application Data

(60) Provisional application No. 60/691,500, filed on Jun. 17, 2005, provisional application No. 60/659,007, filed on Mar. 5, 2005.

(51) Int. Cl.
*H01G 4/38*    (2006.01)

(52) U.S. Cl. ............... 361/328; 361/272; 361/277; 361/278; 361/280

(58) Field of Classification Search ........... 361/328, 361/321.1, 321.2, 306.1, 306.3, 272–277; 341/150, 172
See application file for complete search history.

(56) References Cited

U.S. PATENT DOCUMENTS

| | | | |
|---|---|---|---|
| 4,195,282 A * | 3/1980 | Cameron | 341/172 |
| 4,200,863 A * | 4/1980 | Hodges et al. | 341/156 |
| 4,476,456 A * | 10/1984 | Domogalla | 341/118 |
| 4,531,113 A * | 7/1985 | Abraham | 341/136 |
| 4,701,732 A | 10/1987 | Nestlerode | |
| 5,103,195 A | 4/1992 | Dunsmore | |
| 5,654,679 A | 8/1997 | Mavretic et al. | |
| 5,849,136 A | 12/1998 | Mintz et al. | |
| 5,880,921 A | 3/1999 | Tham et al. | |
| 5,905,398 A * | 5/1999 | Todsen et al. | 327/337 |
| 6,034,414 A * | 3/2000 | Lin | 257/600 |
| 6,252,354 B1 | 1/2001 | Collins et al. | |
| 6,404,376 B1 * | 1/2001 | Kalthoff et al. | 341/172 |
| 6,418,006 B1 * | 1/2001 | Liu et al. | 361/277 |
| 6,424,232 B1 | 1/2001 | Mavretic et al. | |
| 6,677,828 B1 | 1/2001 | Harnett et al. | |
| 6,781,459 B1 | 1/2001 | Brown | |
| 6,794,951 B2 | 1/2001 | Finley | |

FOREIGN PATENT DOCUMENTS

| | | |
|---|---|---|
| EP | 0293454 B1 | 12/1988 |
| EP | 0423442 B1 | 4/1991 |
| EP | 0840349 A2 | 5/1998 |
| EP | 0840350 A2 | 5/1998 |
| EP | 0904634 B1 | 3/1999 |
| EP | 1182686 A2 | 2/2002 |

\* cited by examiner

*Primary Examiner*—Nguyen T. Ha
(74) *Attorney, Agent, or Firm*—Pepper Hamilton LLP

(57) ABSTRACT

A capacitor array may include a bottom electrode, a plurality of top electrodes, at least one dielectric medium and a plurality of switching mechanisms. Each switching mechanism may separably electronically connect two or more top electrodes. The at least one dielectric medium may include a plurality of discrete capacitors each in contact with a top electrode and the bottom electrode.

19 Claims, 9 Drawing Sheets

ELECTRONICALLY VARIABLE CAPACITOR ARRAY

CROSS-REFERENCE TO RELATED APPLICATIONS

This application claims priority to U.S. Provisional Application No. 60/659,007 entitled "An Electronically Variable Discreet Capacitor Array," filed on Mar. 5, 2005, and U.S. Provisional Application No. 60/691,500 entitled "An Electronically Variable Integrated Capacitor Array," filed on Jun. 17, 2005, each of which is incorporated herein by reference in its entirety.

BACKGROUND

1. Technical Field

The disclosed embodiments generally relate to methods and systems for providing a variable capacitance to an electronic circuit.

2. Background

Switched capacitor banks are used in microelectronics for a variety of reasons. For example, a switched capacitor bank can be used to adjust the resonance of a tunable resonator, to alter the transfer function of or to tune a filter, or to match a load impedance of an amplifier.

A monolithically integrated switched capacitor bank using Micro Electro Mechanical System (MEMS) technology is described in U.S. Pat. No. 5,880,921. The capacitor bank includes a plurality of switch-capacitor pairs attached in parallel between a power line and a ground line. Each switch-capacitor pair includes a MEMS switch in series with a capacitor. Similar devices incorporating mechanical relays and field effect transistors instead of MEMS switches are also described therein.

The capacitance of a parallel plate system, where a dielectric medium is located between two electrodes, is determined by the following formula:

$$C = \frac{\varepsilon_0 \varepsilon_r A}{d},$$

where $\varepsilon_0$ equals the free space permitivitty (i.e., $8.85418 \times 10^{-14}$ F/cm), $\varepsilon_r$ equals the relative permitivitty (i.e., the dielectric constant) of the dielectric medium, A equals the area of overlap between the top and bottom electrodes, and d equals the thickness of the dielectric medium between the two electrodes.

Based on the above formula, if a plurality of capacitors in a capacitor array are electrically connected in parallel this results in an increase in the overlap area of the electrodes, thus the capacitance associated with the connected capacitors may be substantially equal to the sum of the individual capacitances associated with each capacitor. Accordingly, if capacitors in a capacitor array can be controllably and separably connected, a variable capacitor can be produced.

What is needed is a method and system for providing an electronically variable capacitor array for supplying a variable capacitance.

The present disclosure is directed to solving the above listed problem.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It is also noted that as used herein and in the appended claims, the singular forms "a," "an," and "the" include plural references unless the context clearly dictates otherwise. Thus, for example, reference to a "capacitor" is a reference to one or more capacitors and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

In an embodiment, a capacitor array may include a bottom electrode, a plurality of top electrodes, at least one first dielectric medium, and a plurality of switching mechanisms. Each switching mechanism may separably electronically connect two or more top electrodes.

In an embodiment, a capacitor array may include a bottom electrode, a plurality of top electrodes, a plurality of discrete capacitors, wherein each discrete capacitor is in contact with the bottom electrode and a top electrode corresponding to the discrete capacitor, and a plurality of switching mechanisms. Each switching mechanism may separably electronically connect two or more top electrodes.

In an embodiment, a capacitor array may include a bottom electrode, a plurality of top electrodes, a dielectric medium in contact with the bottom electrode and each top electrode, and a plurality of switching mechanisms. Each switching mechanism may separably electronically connect two or more top electrodes.

BRIEF DESCRIPTION OF THE DRAWINGS

Aspects, features, benefits and advantages of the embodiments described herein will be apparent with regard to the following description, appended claims and accompanying drawings where:

DETAILED DESCRIPTION

Figure 1A:
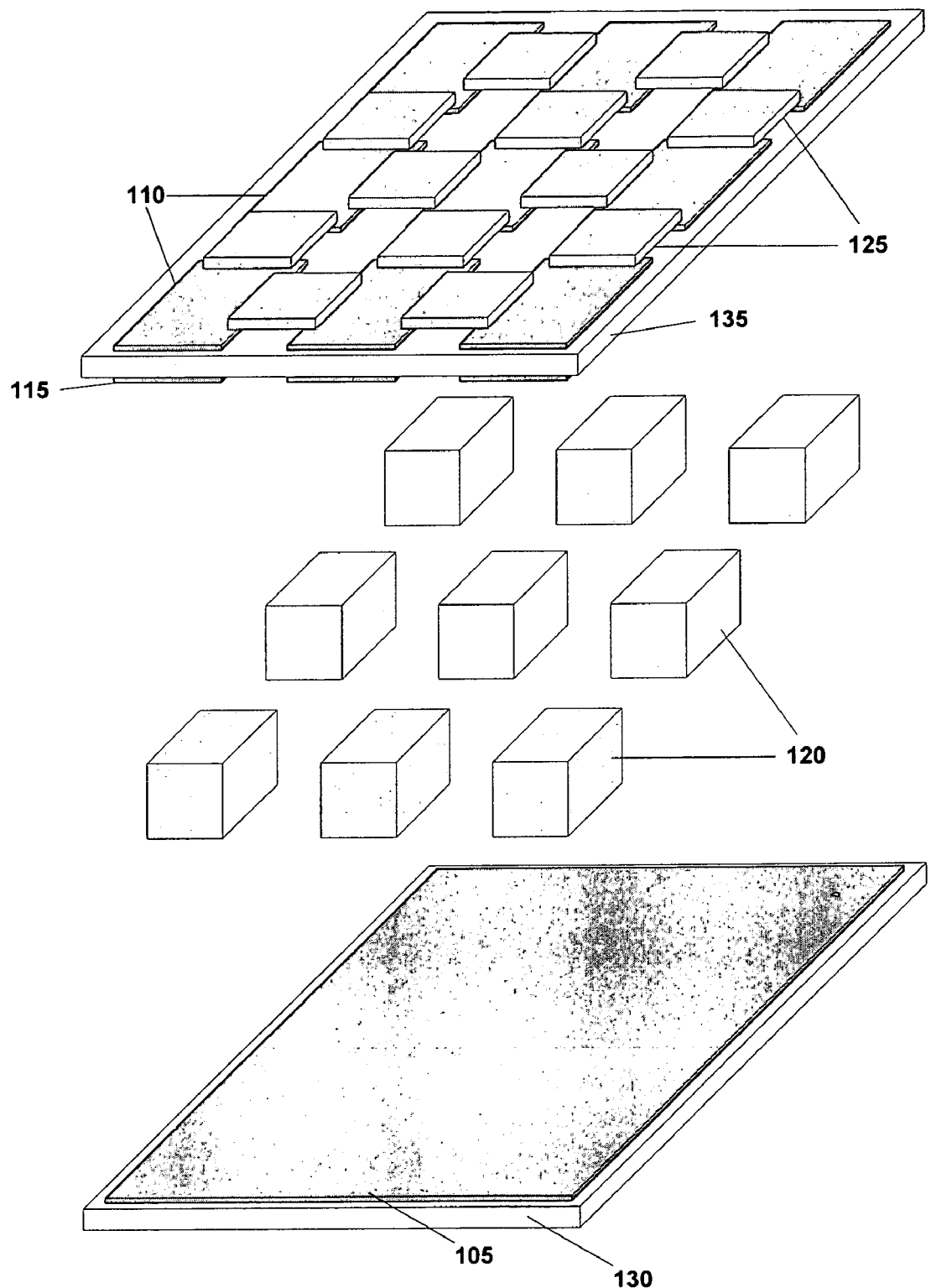
FIG. 1A depicts an expanded view of an exemplary electronically variable discrete capacitor array according to an embodiment.

FIG. 1A depicts an expanded view of an exemplary electronically variable discrete capacitor array according to an embodiment. As shown in FIG. 1A, an electronically variable discrete capacitor array may include a bottom electrode 105, a plurality of top external electrodes 110, a plurality of top internal electrodes 115, a plurality of discrete capacitors 120, and a plurality of switching mechanisms 125 between the top electrodes.

In an embodiment, the bottom electrode 105 may comprise an internal metallization layer. In an embodiment, the bottom electrode 105 may be placed on top of a first dielectric layer 130. The first dielectric layer 130 may be made of a dielectric medium. In an embodiment, the first dielectric layer 130 may comprise, for example, $Al_2O_3$, AlN, BeO, and/or any other dielectric medium known to those of ordinary skill in the art. In an embodiment, the bottom electrode 105 may further comprise an external metallization layer (not shown) located on an opposite side of the first dielectric layer 130 from the internal metallization layer. In an embodiment, one or more of the internal and external metallization layers may comprise, for example, direct bonded copper (DBC), aluminum, gold and/or any other conductive metal now or hereafter known to those of ordinary skill in the art. In an embodiment, one or more of the internal and external metallization layers may be screen-printed and/or deposited onto the first dielectric layer 130.

In an embodiment, the top electrodes 110 may comprise one or more metallization layers and/or a second dielectric layer 135. In an embodiment, the one or more metallization layers of each top electrode 110 may each comprise, for example, DBC, aluminum, gold and/or any other conductive metal now or hereafter known to those of ordinary skill in the art. An external metallization layer may be patterned on a first side of the second dielectric layer 135 such that it forms individual top external electrodes 110. An internal metallization layer may likewise be patterned on a second side of the second dielectric layer 135 such that it forms individual top internal electrodes 115. In an embodiment, each top external electrode 110 may correspond to a top internal electrode 115 to form an electrode pair. The electrode pairs may be electrically connected to each other using metallized vias (not shown) through the second dielectric layer 135. As such, any electrical connection made to one electrode of an electrode pair may result in an electrical connection to the other electrode of the electrode pair. Accordingly, each electrode pair will be hereinafter referred to simply as a top electrode.

As shown in FIG. 1A, a first electrode of each discrete capacitor 120 may be electrically connected to the internal metallization layer of the bottom electrode 105. As such, the bottom electrode 105 may form a common electrode for all discrete capacitors 120 in a capacitor array 100. In an alternate embodiment, a plurality of portions of the bottom electrode 105 may each form a common electrode for one or more discrete capacitors 120, where each portion is not electrically connected to any other portion. A second electrode of each discrete capacitor 120 may be electrically connected to a corresponding top internal electrode 115. In an embodiment, the one or more discrete capacitors may comprise a ceramic.

The number and arrangement of the top electrodes 110 shown in FIG. 1A is arbitrary. In an embodiment, more or fewer top electrodes 110 may be used. In an embodiment, the top electrodes 110 may be arranged in a two-dimensional array of any width and length. In an embodiment, the top electrodes 110 may be arranged in a two-dimensional array with one or more gaps between electrodes of varying sizes. In an embodiment, the width and length of each top electrode 110 may vary among top electrodes and may not be of a uniform width and length as is shown in FIG. 1A.

Figure 1B:
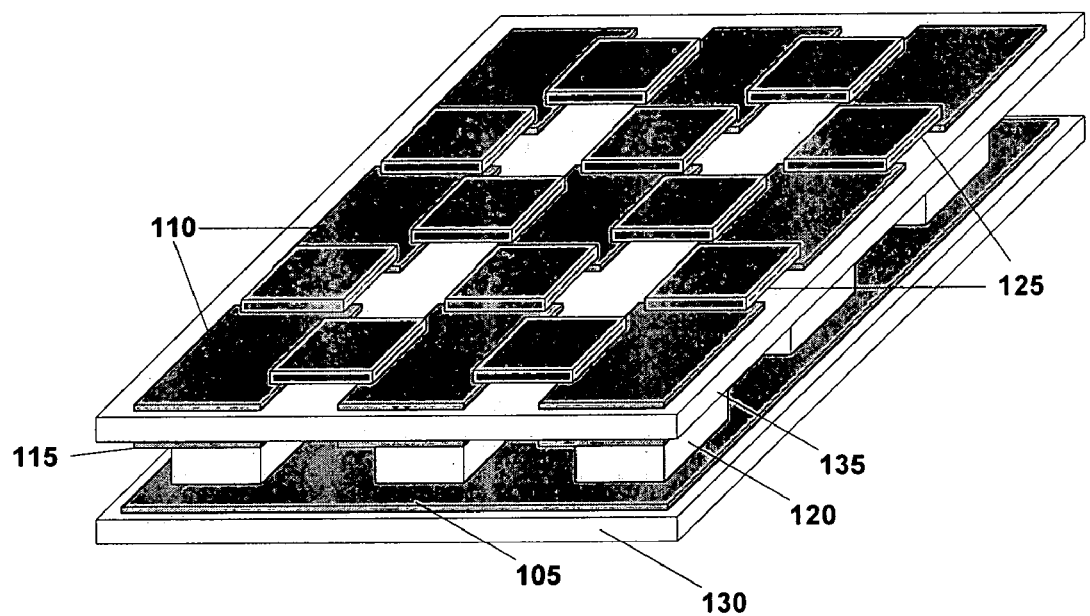
FIG. 1B depicts an exemplary electronically variable discrete capacitor array according to an embodiment.

FIG. 1B depicts an exemplary electronically variable discrete capacitor array according to an embodiment. As shown in FIG. 1B, an assembled electronically variable discrete capacitor array 100 may include a plurality of discrete capacitors 120 electrically connected to one common electrode 105 on one side and to individual top electrodes 110 on the other side. In an embodiment, adjacent top electrodes 110 may be separably electronically connected using one or more switching mechanisms 125. Each switching mechanism 125 may include one or more of, for example, a Micro Electro Mechanical (MEM) switch, a PiN diode switch, a solid state relay, a field effect transistor and/or any other switching mechanism known to one of ordinary skill in the art. Although the embodiments described below comprise MEM switches, it will be apparent to one of ordinary skill in the art that equivalent operations may be performed with any other switching mechanism including the ones described above.

In an embodiment, one or more switching mechanisms 125 may be placed in any orientation between top electrodes 110. For example, a switching mechanism 125 may be placed on top of, in the same plane with, and/or under a top electrode 110 that it separably electrically connects.

Figure 2A:
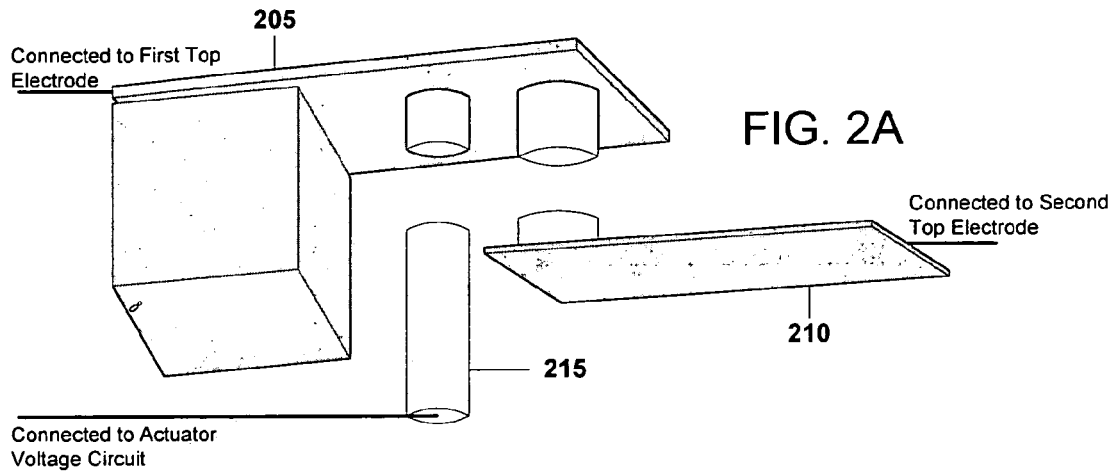
FIGS. 2A-C depict views of an exemplary Micro Electro Mechanical (MEM) switch according to an embodiment.
Figure 2B:
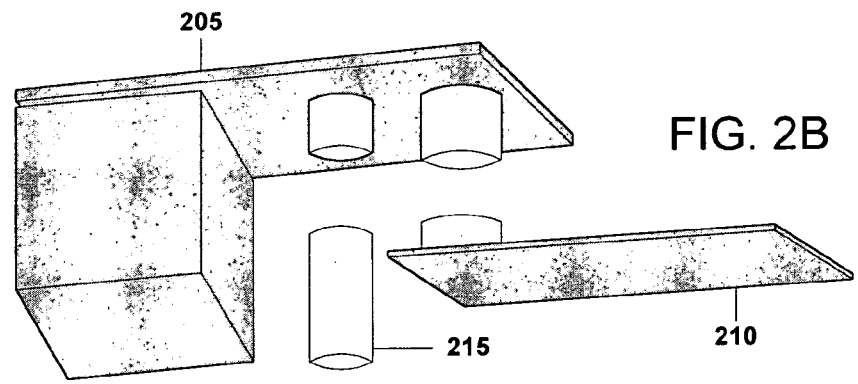
Figure 2C:
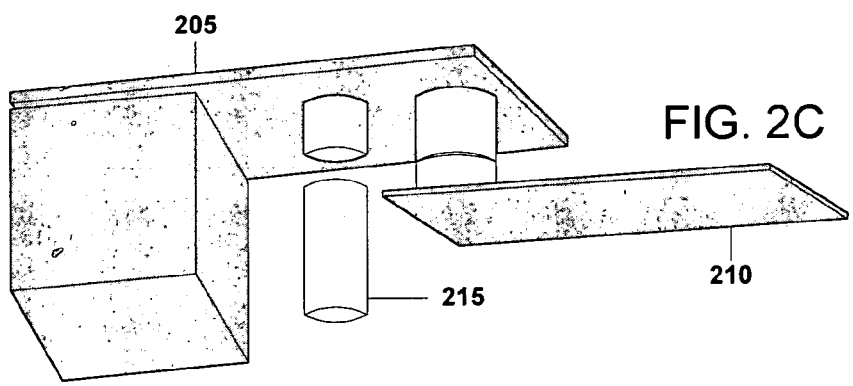

FIGS. 2A-C depict an exemplary MEM switch according to an embodiment. As shown in FIG. 2A, the MEM switch 140 may include a cantilever 205 electrically connected to a first top electrode and a receiver 210 electrically connected to a second top electrode. The MEM switch 140 may further include an actuator 215 electrically connected to a voltage source. When an OFF voltage level is provided to the actuator 215, an open connection may result between the cantilever 205 and the receiver 210 of the MEM switch 140, as depicted in FIG. 2B. Conversely, when an ON voltage level is provided to the actuator 215, a closed connection may result between the cantilever 205 and the receiver 210 of the MEM switch 140, as depicted in FIG. 2C.

Figure 3:
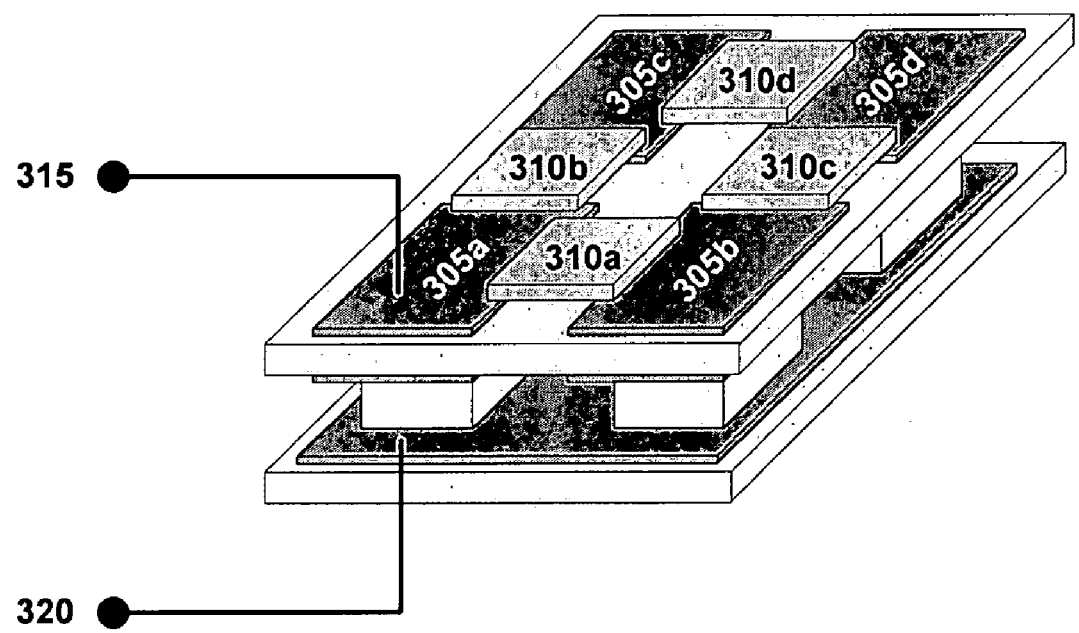
FIG. 3 depicts an exemplary discrete capacitor array and its interconnections according to an embodiment.

FIG. 3 depicts an exemplary discrete capacitor array and its interconnections according to an embodiment. As shown in FIG. 3, the four top electrodes 305a-d may have interconnections 310a-d between adjacent electrodes. Fewer or more connections may be made between the top electrodes 305a-d within the scope of this invention. In addition, an electrical connection to other circuitry may be made by a connection 315 to, for example, top electrode 305a and a connection 320 to, for example, the bottom electrode 105. In an embodiment, each interconnection 310a-d may include one or more MEM switches and a controlling mechanism (not shown) that controls the voltage supplied to the actuator of the MEM switch.

In an embodiment, if the actuation voltage for the MEM switch associated with interconnection 310a is turned ON, the MEM switch may form a closed connection, thereby electrically connecting top electrodes 305a and 305b. As a result, the total surface area of the capacitor connected between connection 315 and connection 320 may increase because the surface area includes both top electrode 305a and top electrode 305b. Accordingly, the capacitance between connection 315 and connection 320 may likewise increase.

Similarly, if the activation voltage for the MEM switch associated with interconnection 310b is turned ON, top electrodes 305a and 305c may be electrically connected. Likewise, if the activation voltages for the MEM switches associated with interconnections 310c or 310d are turned ON, top electrodes 305b and 305d or 305c and 305d, respectively, may be electrically connected. Accordingly, by activating and/or deactivating one or more interconnections 310a-d, the capacitance between connection 315 and connection 320 may vary.

In an embodiment, one or more interconnections, such as 310a-d, may be placed in any orientation between top electrodes 305a-d that it connects. For example, an interconnection 310a may be placed on top of, in the same plane with, and/or under one or more of the top electrodes 305a and/or 305b that it separably electrically connects.

Figure 4:
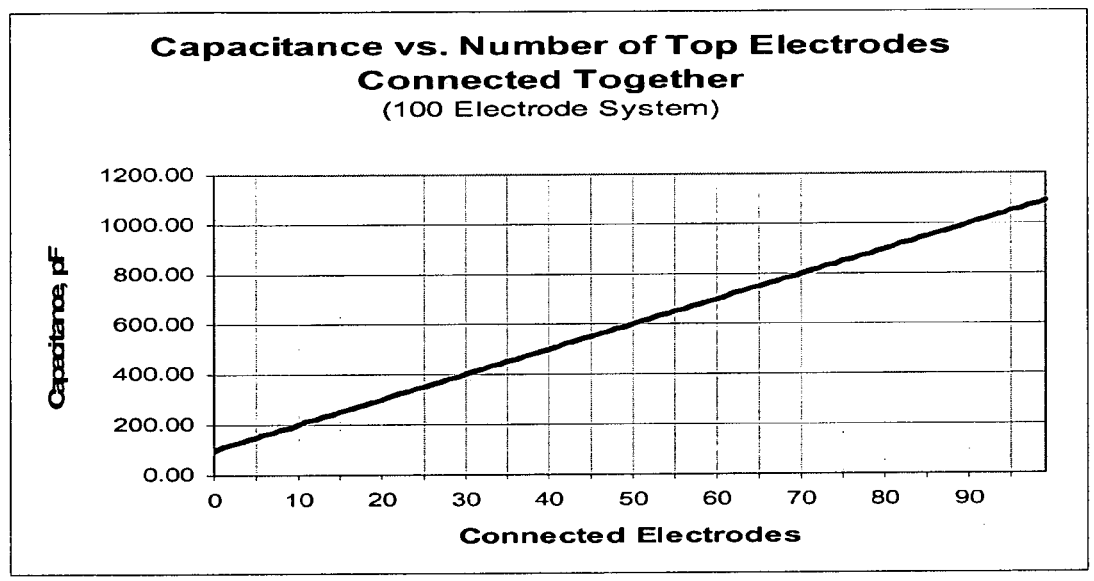
FIG. 4 depicts a graph of the capacitance of an exemplary discrete capacitor array versus the number of electrodes connected together according to an embodiment.

FIG. 4 depicts a graph of the capacitance of an exemplary discrete capacitor array versus the number of electrodes connected together according to an embodiment. As shown in FIG. 4, the first capacitor (i.e., the capacitor for which its top electrode is connected to the external circuitry) may have a capacitance of 100 pF and the remaining capacitors may have a capacitance of 10 pF each. Other values for one or more of the capacitors may also be used within the scope of this disclosure. In an embodiment, the size of a capacitor array having 100 discrete capacitors may be approximately 12.5 cm by approximately 7.5 cm. Other sizes are possible. Capacitor arrays having more or fewer discrete capacitors and/or having different physical dimensions may be used within the scope of this disclosure.

Figure 5:
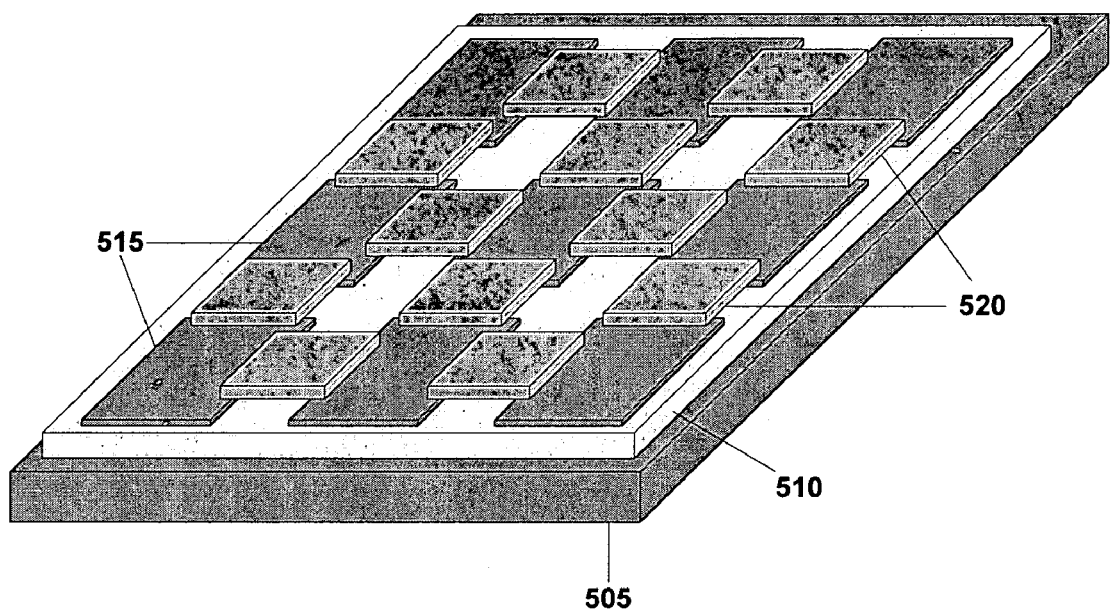
FIG. 5 depicts an exemplary electronically variable integrated capacitor array according to an embodiment.

FIG. 5 depicts an exemplary electronically variable integrated capacitor array according to an embodiment. As shown in FIG. 5, an alternate embodiment may include an electronically variable integrated capacitor array including a bottom electrode 505, a dielectric layer 510, a plurality of top electrodes 515, and a plurality of switching mechanisms 520.

The bottom electrode 505 may comprise, for example, a metallization layer and/or an electrically isolating material. In an embodiment, the metallization layer of the bottom electrode 505 may comprise, for example, copper, aluminum, gold and/or any other conductive metal known to those of ordinary skill in the art. In an embodiment, the metallization layer may be deposited onto the electrically isolating material using any known semiconductor fabrication process. In an embodiment, the electrically isolating material may comprise $SiO_2$.

The dielectric layer 510 may comprise a dielectric medium providing a suitable dielectric constant for the capacitor array. For example, the dielectric layer 510 may comprise, for example, $SiO_2$, Organic and Inorganic dielectrics, and/or any other semiconductor dielectric medium known to those of ordinary skill in the art. In an embodiment, the dielectric layer 510 may be deposited on a side of the bottom electrode.

The plurality of top electrodes 515 may be deposited and/or grown on top of the dielectric layer 510. The top electrodes 515 may be patterned as individual top electrodes. In an embodiment, each top electrode 515 may comprise, for example, copper, aluminum, gold and/or any other conductive metal known to those of ordinary skill in the art.

In an embodiment, a semiconductor manufacturing process may be used to build a switching mechanism 520 between adjacent top electrodes 515. Each switching mechanism may include one or more of a MEM switch, a PiN diode, a solid state relay, a field effect transistor and/or any other switching mechanism known to one of ordinary skill in the art. As shown in FIG. 5, an assembled electronically variable integrated capacitor array 500 may be electrically equivalent to a plurality of capacitors connected to one common electrode 505 on one side and to individual electrodes 515 on the other side with electrical switching mechanisms 520 between the adjacent individual electrodes. In an embodiment, one or more switching mechanisms 520 may be placed in any orientation between top electrodes 515. For example, a switching mechanism 520 may be placed on top of, in the same plane with, and/or under a top electrode 515 that it separably electrically connects.

Figure 6:
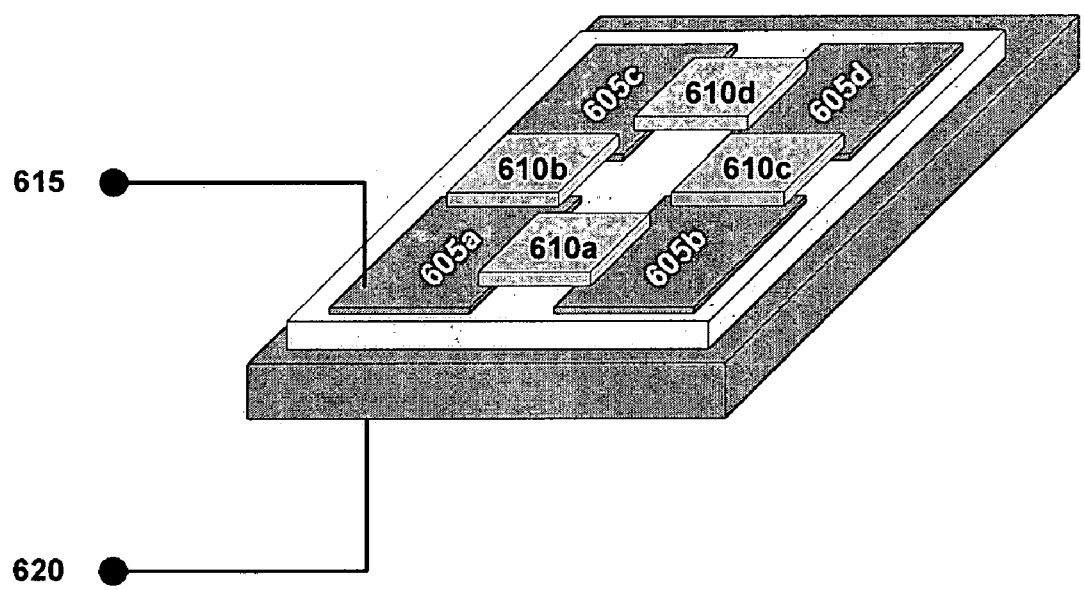
FIG. 6 depicts an exemplary integrated capacitor array and its interconnections according to an embodiment.

FIG. 6 depicts an exemplary integrated capacitor array and its interconnections according to an embodiment. As shown in FIG. 6, four top electrodes 605a-d may have interconnections 610a-d between adjacent electrodes. In addition, an electrical connection to other circuitry may be made by a connection 615 to, for example, top electrode 605a and a connection 620 to, for example, the bottom electrode 505. In an embodiment, each interconnection 610a-d may include one or more MEM switches, PiN diodes, solid state relays, field effect transistors and/or any other switching mechanisms known to one of ordinary skill in the art, and a controlling mechanism (not shown) that controls a voltage for activating the one or more switching mechanisms.

In an embodiment, if the actuation voltage for the switching mechanism associated with interconnection 610a is at an ON level, the switching mechanism may form a closed connection, thereby electrically connecting top electrodes 605a and 605b. As a result, the total surface area of the capacitor connected between connection 615 and connection 620 may increase because the surface area includes both top electrode 605a and top electrode 605b. Accordingly, the capacitance between connection 615 and connection 620 may likewise increase.

Similarly, if the activation voltage associated with interconnection 610b is turned ON, top electrodes 605a and 605c may be electrically connected. Likewise, if the activation voltages for the MEM switches associated with interconnections 610c or 610d are turned ON, top electrodes 605b and 605d or 605c and 605d, respectively, may be electrically connected. Accordingly, by activating and/or deactivating one or more interconnections 610a-d, the capacitance between connection 615 and connection 620 may vary.

In an embodiment, one or more interconnections, such as 610a-d, may be placed in any orientation between top electrodes, such as 605a-d, that it connects. For example, an interconnection 610a may be placed on top of, in the same plane with, and/or under one or more of the top electrodes 605a and/or 605b that it separably electrically connects.

Figure 7:
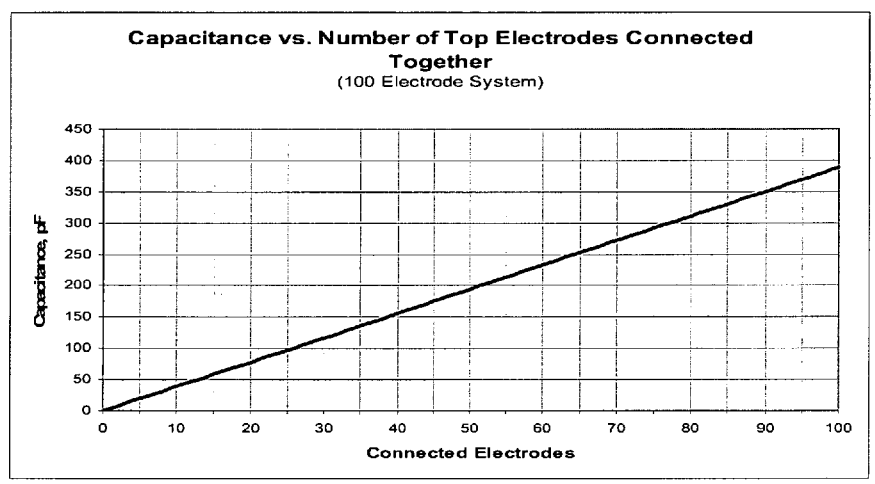
FIG. 7 depicts a graph of the capacitance of an exemplary integrated capacitor array versus the number of electrodes connected together according to an embodiment.

FIG. 7 depicts a graph of the capacitance of an exemplary integrated capacitor array versus the number of electrodes connected together according to an embodiment. The graph in FIG. 7 may be based upon individual capacitors formed with a $SiO_2$ (dielectric layer) thickness of approximately 20 μm and top electrodes having dimensions of approximately 1.5 mm by approximately 1.5 mm. In an embodiment, the overall size of such a capacitor array with 100 capacitors may be approximately 2.5 cm by approximately 2.5 cm. Other sizes are possible.

Figure 8A:
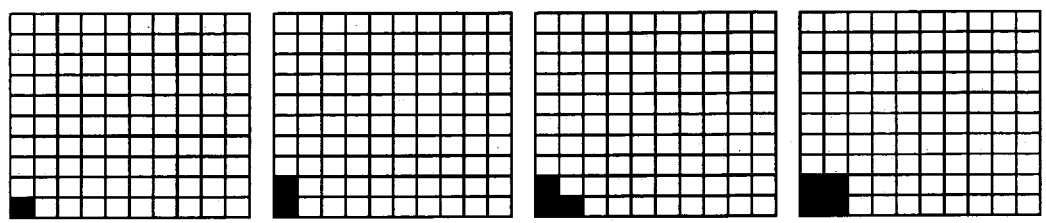
FIGS. 8A and 8B depict exemplary sequences of connecting electrodes of an electronically variable capacitor array according to an embodiment.
Figure 8B:
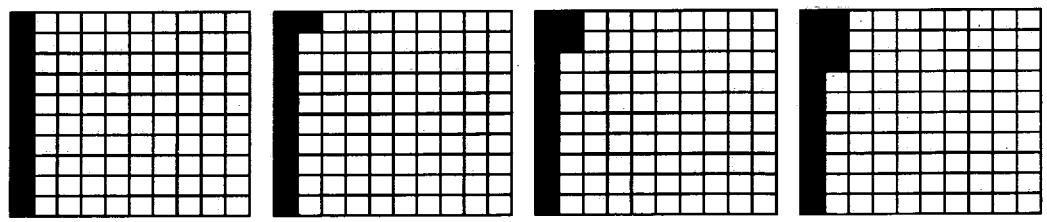

FIGS. 8A and 8B depict exemplary sequences of connecting electrodes of an electronically variable capacitor array according to an embodiment. FIG. 8A depicts a first exemplary sequence of turning ON a switching mechanism in a discrete and/or integrated capacitor array. As shown in FIG. 8A, top electrodes having a shortest distance to the externally electrically connected top electrode may be electrically connected, directly or indirectly, to the externally electrically connected top electrode prior to other top electrodes.

FIG. 8B depicts a second exemplary sequence of turning ON a switching mechanism in either a discrete or integrated capacitor array. As shown in FIG. 8B, top electrodes closest to the externally electrically connected top electrode in a first column of the capacitor array may be electrically connected to the externally electrically connected top electrode first. When all of the top electrodes in the first column are connected, directly or indirectly, to the externally electrically connected top electrode, the top electrodes in an adjoining column may be sequentially connected, directly or indirectly, to the externally electrically connected top electrode sequentially, and so on.

Other sequences for turning ON switching mechanisms may also be performed within the scope of this disclosure and will be apparent to those of ordinary skill in the art.

In an embodiment, an electronically variable capacitor array may be put in parallel and/or in series with an external circuit. In an embodiment, an electronically variable capacitor array may be used in a variety of applications, such as in, for example, electronic tuning circuits, electronic matching networks, and/or electronic optimization circuits. Alternate and/or additional circuits may also use electronically variable capacitor arrays within the scope of this disclosure and as will be apparent to one of ordinary skill in the art.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those of ordinary skill in the art which are also intended to be encompassed by the disclosed embodiments.

What is claimed is:

1. A capacitor array, comprising:
    a bottom electrode;
    a plurality of top electrodes;
    at least one first dielectric medium; and
    a plurality of switching mechanisms, wherein each switching mechanism independently separably electronically connects two or more top electrodes.

2. The capacitor array of claim 1, wherein the at least one first dielectric medium comprises a plurality of discrete capacitors, wherein each discrete capacitor is in contact with the bottom electrode and a corresponding top electrode.

3. The capacitor array of claim 1 wherein the at least one first dielectric medium comprises a dielectric medium in contact with the bottom electrode and each top electrode.

4. The capacitor array of claim 1 wherein the bottom electrode comprises a first metallization layer.

5. The capacitor array of claim 4 wherein the bottom electrode further comprises a second dielectric medium.

6. The capacitor array of claim 5 wherein the second dielectric medium comprises one or more of $Al_2O_3$; AlN; and BeO.

7. The capacitor array of claim 5 wherein the bottom electrode further comprises a second metallization layer, wherein the first metallization layer is electrically connected to the second metallization layer through the dielectric layer.

8. The capacitor array of claim 1 wherein at least one top electrode comprises a first metallization layer and a second metallization layer, wherein the first metallization layer is electrically connected to the second metallization layer through a second dielectric layer.

9. The capacitor array of claim 1 wherein the plurality of switching mechanisms comprise one or more of the following:
    a micro electro mechanical switch;
    a PiN diode,
    a solid state relay, and
    a field effect transistor.

10. The capacitor array of claim 1 wherein a top electrode and the bottom electrode are electrically connected to an external circuit.

11. A capacitor array, comprising:
    a bottom electrode;
    a plurality of top electrodes;
    a plurality of discrete capacitors, wherein each discrete capacitor is in contact with the bottom electrode and a top electrode corresponding to the discrete capacitor; and
    a plurality of switching mechanisms, wherein each switching mechanism independently separably electronically connects two or more top electrodes.

12. The capacitor array of claim 11, further comprising:
    a first dielectric medium, wherein the bottom electrode is located on the first dielectric medium; and
    a second dielectric medium, wherein the plurality of top electrodes are located on the second dielectric medium.

13. The capacitor array of claim 12 wherein the first dielectric medium comprises one or more of $Al_2O_3$; AlN; and BeO.

14. The capacitor array of claim 11 wherein a first top electrode is electrically connected to a second top electrode when a switching mechanism positioned between the first top electrode and the second top electrode receives an ON signal.

15. The capacitor array of claim 11 wherein a first top electrode and the bottom electrode are each electrically connected to an external circuit.

16. A capacitor array, comprising:
    a bottom electrode;
    a plurality of top electrodes;
    a dielectric medium in contact with the bottom electrode and each top electrode; and
    a plurality of switching mechanisms, wherein each switching mechanism independently separably electronically connects two or more top electrodes.

17. The capacitor array of claim 16 wherein the dielectric medium comprises one or more of $SiO_2$; an organic dielectric; and an inorganic dielectric.

18. The capacitor array of claim 16 wherein a first top electrode is electrically connected to a second top electrode when a switching mechanism between the first top electrode and the second top electrode receives an ON signal.

19. The capacitor array of claim 16 wherein a first top electrode and the bottom electrode are each electrically connected to an external circuit.

* * * * *